(12) United States Patent
Barrault et al.

(10) Patent No.: US 7,666,544 B2
(45) Date of Patent: Feb. 23, 2010

(54) CONNECTION DEVICE FOR ELECTRIC ACCUMULATOR

(75) Inventors: Michel Barrault, Mens (FR); Eric Bettega, Le Fontanil Cornillon (FR); Yvan Cadoux, Voreppe (FR)

(73) Assignee: Batscap, Quimper (FR)

( * ) Notice: Subject to any disclaimer, the term of this patent is extended or adjusted under 35 U.S.C. 154(b) by 322 days.

(21) Appl. No.: 10/469,941

(22) PCT Filed: Mar. 4, 2002

(86) PCT No.: PCT/EP02/02282

§ 371 (c)(1), (2), (4) Date: Sep. 5, 2003

(87) PCT Pub. No.: WO02/071510

PCT Pub. Date: Sep. 12, 2002

(65) Prior Publication Data

US 2004/0092167 A1    May 13, 2004

(30) Foreign Application Priority Data

Mar. 7, 2001    (FR) ................................... 01 03093

(51) Int. Cl.
*H01M 2/26*    (2006.01)
*H01M 2/28*    (2006.01)

(52) U.S. Cl. ...................... 429/121; 429/123; 429/161; 429/62

(58) Field of Classification Search ................. 429/122, 429/123, 158, 161, 208, 211, 239, 62, 24, 429/121, 124, 181, 189; 337/168, 181, 177, 337/159, 157

See application file for complete search history.

(56) References Cited

U.S. PATENT DOCUMENTS

| 4,283,470 | A | | 8/1981 | Freeman et al. ............. 429/209 |
|---|---|---|---|---|
| 4,729,162 | A | * | 3/1988 | Him et al. .................. 29/623.3 |
| 6,040,754 | A | * | 3/2000 | Kawanishi .................. 337/297 |
| 6,187,477 | B1 | * | 2/2001 | Watanabe et al. ...... 429/231.95 |
| 6,373,371 | B1 | * | 4/2002 | Doerrwaechter et al. .... 337/297 |
| 2002/0015892 | A1 | * | 2/2002 | Kitoh ......................... 429/243 |

FOREIGN PATENT DOCUMENTS

| EP | 08050891 | 2/1996 |
|---|---|---|
| JP | 64-38966 | 2/1989 |
| JP | 4-147574 | 5/1992 |
| JP | 5-151993 | 6/1993 |
| JP | 6-203827 | 7/1994 |
| JP | 7-220755 | 8/1995 |
| JP | 7-249404 | 9/1995 |
| JP | 8-50920 | 2/1996 |
| JP | 8-185850 | 7/1996 |
| JP | 10-162805 | 6/1998 |
| JP | 10-188946 | 7/1998 |
| JP | 10-270010 | 10/1998 |
| JP | 11-67188 | 3/1999 |
| JP | 2001-229912 | 8/2001 |

* cited by examiner

*Primary Examiner*—Patrick Ryan
*Assistant Examiner*—Ben Lewis
(74) *Attorney, Agent, or Firm*—Steptoe & Johnson LLP

(57) ABSTRACT

A connection device for an electric accumulator 10 a first connection subassembly 16 associated with one of the electrodes 12. It comprises a metallic conducting strip 20 provided with several pins that will be embedded in the electrode 12 to make the electrical contact, and temperature and/or electrical protection means housed in a fixed module 25 electrically connected to one of the ends of the strip 20.

13 Claims, 3 Drawing Sheets

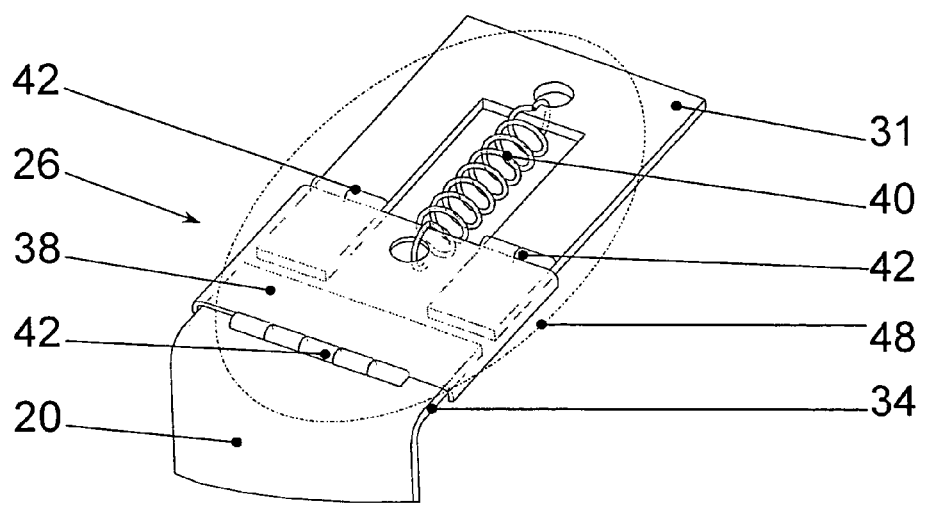
FIG. 8
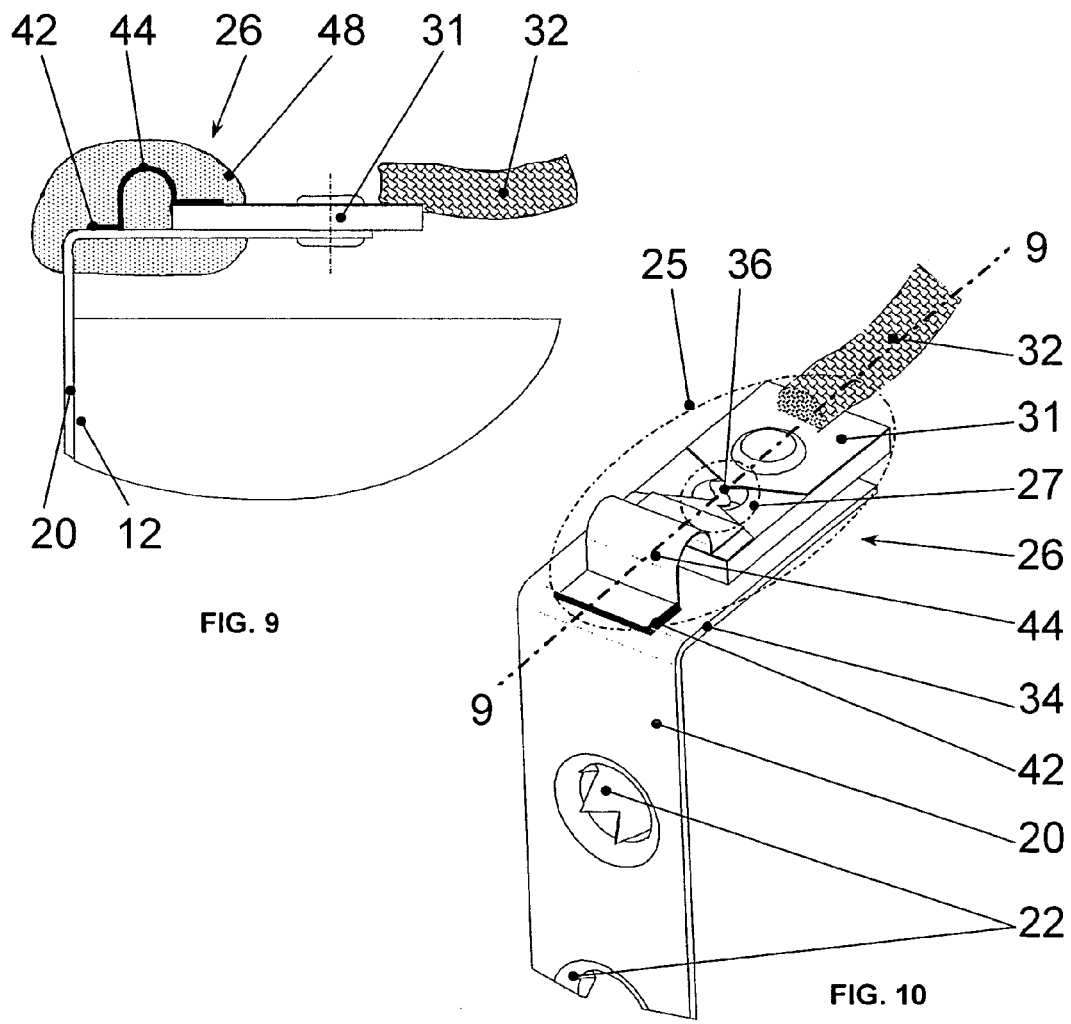
FIG. 9
FIG. 10

CONNECTION DEVICE FOR ELECTRIC ACCUMULATOR

TECHNICAL DOMAIN OF THE INVENTION

The invention relates to a connection device for an electric accumulator comprising a first connection subassembly associated with one of the electrodes, and a second connection subassembly associated with the other electrode.

STATE OF THE ART

Electrical connections for electric accumulators are usually made using connectors that are inserted into electrodes in the form of tabs, or screw-on collars fixed to conducting contacts with opposite polarities. The reliability of the connection interface may be influenced by corrosion or bad tightening, introducing a risk of increasing the electrical resistance. The result is a large voltage drop that reduces the electrical efficiency of the accumulator, and poor dissipation of heat during operation of the accumulator.

PURPOSE OF THE INVENTION

The purpose of the invention is to make a connection device for an accumulator in order to obtain high contact quality in the long term, a low voltage drop and protection against electrical overloads and abnormal temperature rises.

The device according to the invention is characterized in that the first connection subassembly comprises:

- a metallic conducting strip provided with several pins that will be embedded in the electrode to make the electrical contact,
- and temperature and/or electrical protection means housed in a fixed module electrically connected to one of the ends of the strip.

According to one preferred embodiment, the pins are distributed over the entire surface of the strip that comes into contact with the electrode. Advantageously, the plane surface of the electrode is covered by a soft conducting metal strip, particularly based on lithium, before pressure is applied to the strip to force it into place.

According to one special feature of the invention, the temperature protection means comprise a temperature switch activated by a state change of a paste sensitive to a change in temperature, and return means that pull the switch towards the open position when the temperature exceeds a predetermined limit.

According to one characteristic of the invention, the paste is conducting and is located within the contact gap of the temperature switch.

According to another special feature of the invention, the paste is made of a material that melts under the action of heat.

The electrical protection means comprise an electrical switch comprising a circuit breaker with a rated fuse, formed by a local restriction of the cross section of the conducting path of an electrical connecting part.

BRIEF DESCRIPTION OF THE DRAWINGS

Other advantages and characteristics will become clearer from the following description of an embodiment of the invention given as a non-limitative example illustrated in the appended drawings, wherein:

FIGS. 8 and 10 show perspective views illustrating two variant embodiments of the protection module;

FIG. 9 shows a sectional view along line 9-9 in FIG. 10.

DESCRIPTION OF A PREFERRED EMBODIMENT

Figure 1:
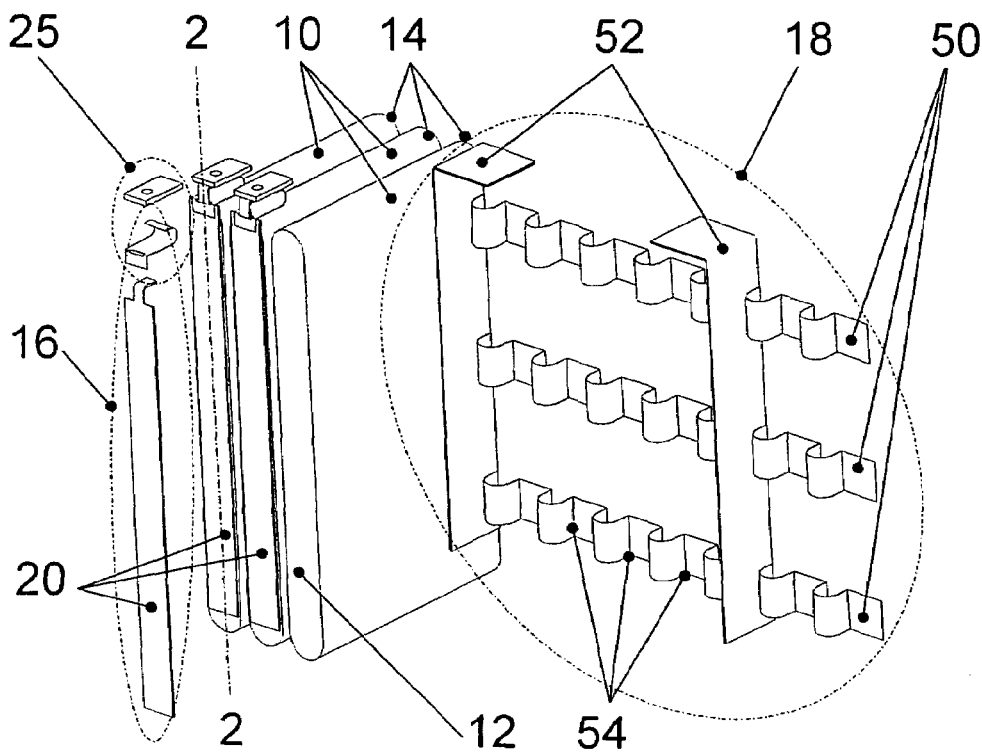
FIG. 1 shows a perspective diagrammatic view of three accumulator elements equipped with the connection device according to the invention.
Figure 2:
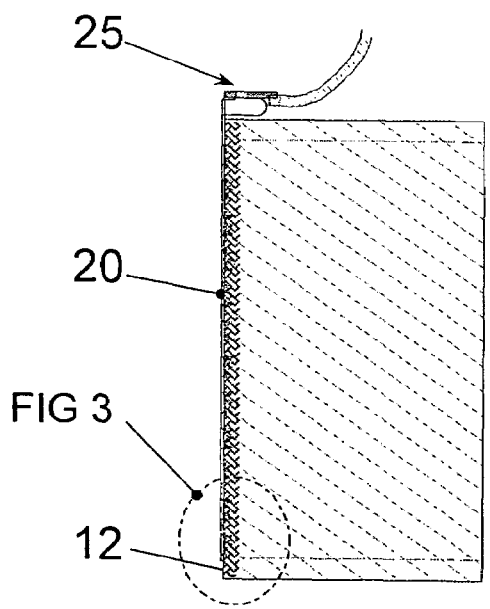
FIG. 2 shows a partial sectional view along the line 2-2 in FIG. 1, illustrating the first connection subassembly fixed to the anode of an accumulator element.
Figure 3:
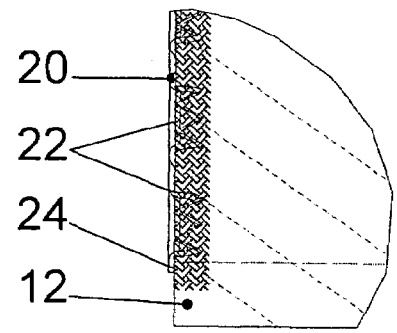
FIG. 3 shows a larger scale view of a detail in FIG. 2.

Modular accumulator elements 10 are installed side by side while remaining connected to an electrical connection device, as illustrated in FIGS. 1 to 3. The small opposite faces of each accumulator element 10 are provided with a pair of plane electrodes 12, 14, called the anode and the cathode respectively. The connection device is composed of a first connection subassembly 16 associated with the anode of each accumulator element 10, and a second connection subassembly 18 associated with the cathodes of the set of accumulator elements 10.

The first connection subassembly 16 of the anode is arranged to perform an electrical contact resistance function, and a temperature and/or electrical protection function. It comprises a rectangular metallic strip 20 made of a conducting material, with an internal surface on which several pins 22 are formed. The first electrode 12 is covered by a sheet 24 of soft metal, for example lithium, with which this strip 20 comes into contact. The pins 22 are embedded into the first electrode 12, and the soft metal of the sheet 24 deforms under the effect of the mechanical pressure applied from the smooth outside face of the strip 20, so as to create good contact between the anode and the first connection subassembly 16.

Figure 4:
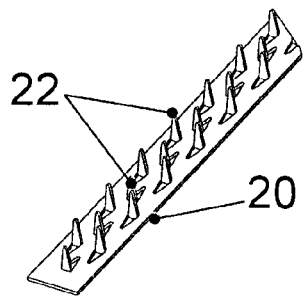
FIGS. 4 and 5 show two example embodiments of the pin strip forming the first connection subassembly.
Figure 5:
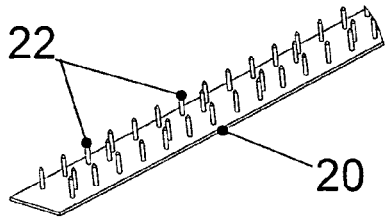

The pins 22 distributed on the internal surface of the conducting strip 20 may be made by any process, particularly by stamping or perforating a metal sheet (FIGS. 2 and 3), by stamping (FIG. 4), dendritic deposition or chemical or electrochemical reaction (FIG. 5).

Good contact of the strip 20 on the anode guarantees electrical and thermal conductivity of the connection interface, firstly enabling the accumulator element 10 to discharge with maximum electrical efficiency, and secondly dissipation of heat generated by the Joule effect due to permanent current circulation, or an internal defect.

Figure 6:
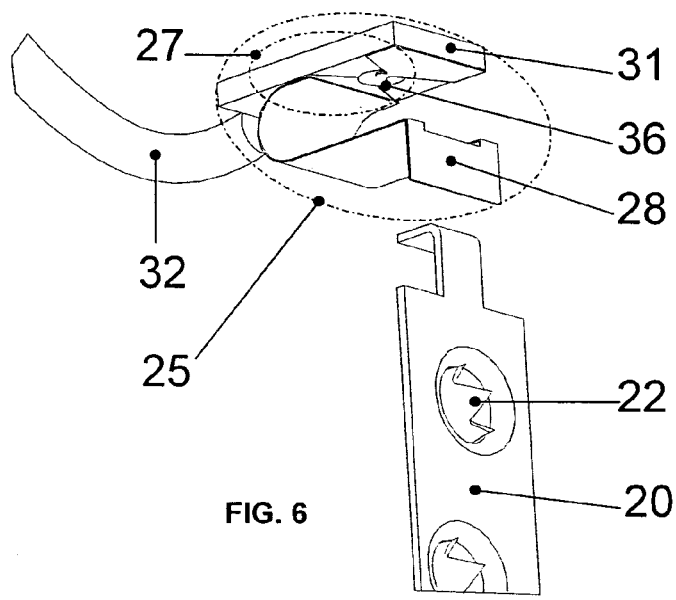
FIG. 6 shows an exploded perspective view of the protection module associated with the top part of the pin strip.
Figure 7:
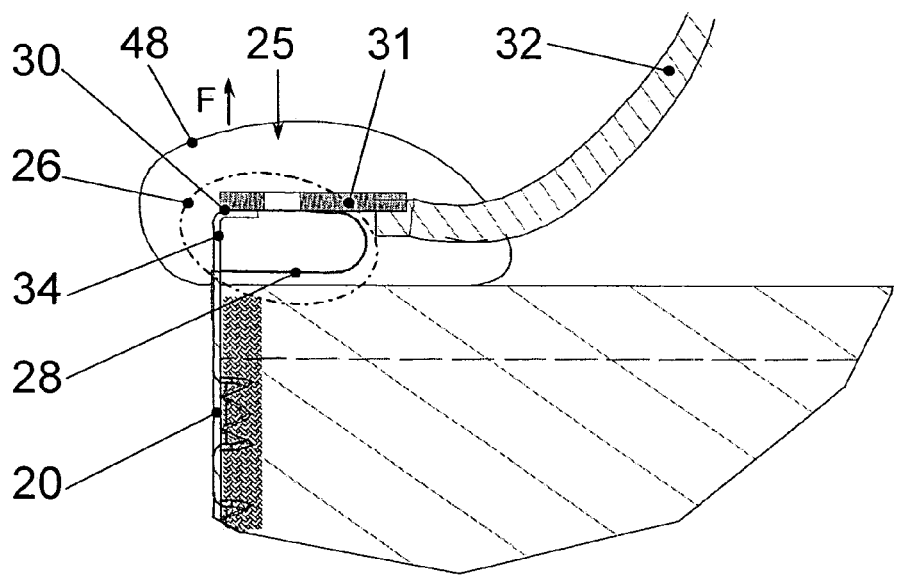
FIG. 7 shows a vertical sectional view of FIG. 6 after assembly of the protection module with the strip.

In FIGS. 6 and 7, the protection means comprise a fixed module electrically connected to the top end of the strip 20 and fitted with a temperature switch 26 and an electrical switch 27. According to a first embodiment, the temperature switch 26 is composed of a conducting spring strip 28 and a contact gap filled with conducting paste 30 with a predetermined softening point that depends on the temperature. The spring strip 28 forms a calibrated conducting spring inserted between the strip 20 and a conducting connecting part 31 to which the load power supply cable 32 is connected.

The conducting paste 30 in the interval between the curved end bracket 34 of the strip 20 and the connecting part 31 remains in the solid state as long as the temperature remains below the softening threshold. Most of the nominal current that passes through the accumulator element 10 passes through the conducting paste 30 without a significant voltage drop, since the electrical resistance of the steel spring 28 is greater than the resistance of the paste 30.

If the temperature in the controlled area increases, the softening threshold of the paste 30 in the contact gap is exceeded causing expansion of the steel strip spring 28, making the connecting part 31 move along the direction of arrow F opening the contacts delimiting the contact gap. The current then circulates in the steel strip spring 28, and its high electrical resistance reduces the current intensity. Thus, the temperature switch 26 protects the accumulator element 10 whenever the temperature rises due to an internal fault or incorrect use.

The electrical switch 27 in FIG. 6 is composed of a circuit breaker with a rated fused installed in series between the temperature switch 26 and the output cable 32. For example, the fused circuit breaker may be formed by a local restriction of section 36 on the conducting path on the connecting part 31. This narrowed section 36 melts due to the Joule effect as soon as the intensity of the current exceeds a given overload threshold.

The two contact gaps of the two switches 26, 27 are connected in series and are activated separately from each other. In one variant embodiment, it is clear that only one electrical breaking zone can be used to perform the temperature and electrical protection functions.

In FIG. 8, the temperature switch 26 comprises a sliding conducting sleeve 38, the end bracket 34 of the strip 20 fitting into one end and the connecting part 31 fitting into the other end. The sleeve 38 acts as a conducting bridge between the end bracket 34 and the connecting part 31, and a tension spring 40 is attached to the sleeve 38. A thermo-melting paste 42 holds the temperature switch 36 in the closed position as long as the temperature remains below a predetermined threshold. If the temperature threshold is exceeded, the paste 42 melts and the spring 40 moves the sleeve 38 in translation to open the temperature switch 26.

In FIGS. 9 and 10, the temperature switch 26 is equipped with a spring strip 44 made of a conducting material that bears on the pin 44 and the connecting part 31, through an intermediate thermo-melting material 42. As the material 42 melts, the circuit opens due to expansion of the spring strip 44. The electrical switch 27 is identical to that shown in FIG. 6.

In the three embodiments in FIGS. 7 to 10, the protection module 25 is insert moulded in a rigid insulating material. The contact zones may be encased by a non-conducting insulating material 48, particularly wax, with a melting point below the melting point of the conducting paste 30, 42 in the temperature switch 26.

According to one variant embodiment, the temperature and electrical protections described above may be provided by a single component with an electrical resistance that depends on its internal temperature, for example a positive temperature coefficient, or PTC, resistance in series with the strip 20. This type of component may change from a very low internal resistance to a sufficiently high resistance to limit or interrupt the output current. The energy necessary for this state change may originate either from the environment or the Joule effect.

The second connection subassembly 18 at the cathode end is shown in FIG. 1. The electrical contact between several accumulator elements 10 and electrode 14 is made by welding of foil 50. The foil is shaped like bellows to enable transverse expansion, and foil elements are interconnected through resistance plates 52. Welding of foil 50 to electrodes 14 is facilitated by pre-tinning of contact areas 54.

The invention claimed is:

1. A connection device for an electric accumulator comprising a first external connection subassembly associated with a first electrode of the electric accumulator, and a second external connection subassembly associated with a second electrode of the electric accumulator, the first external connection subassembly comprising:
    a first metallic conducting strip having several pins for being embedded in the first electrode to make electrical contact, and
    at least one of temperature and electrical protection means housed in a fixed module electrically connected to one end of the strip.

2. A connection device for an electric accumulator according to claim 1, wherein a first surface of the first strip contacts the first electrode, and the pins are distributed over the entire first surface of the first strip.

3. A connection device for an electric accumulator according to claim 1, further comprising a second soft conducting metal strip covering a surface of the first electrode adjacent to the first strip.

4. A connection device for an electric accumulator according to claim 3, wherein the second strip comprises lithium.

5. A connection device for an electric accumulator according to claim 1, wherein temperature protection means comprise a temperature-sensitive paste and return means, and
    when a temperature of the paste exceeds a predetermined limit, the return means pull the switch towards an open position.

6. A connection device for an electric accumulator according to claim 5, wherein the conducting paste is located in a contact gap between the first strip and connector of a power supply cable.

7. A connection device for an electric accumulator according to claim 5, wherein the paste comprises a material that melts under heat.

8. A connection device for an electric accumulator according to claim 1, wherein the electrical protection means comprise an electrical switch comprising a circuit breaker with a rated fuse, the fuse comprising a local restriction of a conducting path between the first strip and an electrical connecting part for connecting the first strip to an electrical power cable.

9. A connection device for an electric accumulator according to claim 1, wherein the protection means comprise a positive temperature coefficient resistance in series with the first strip.

10. A connection device for an electric accumulator according to claim 1, wherein the second connection subassembly comprises a foil welded to the second electrode,
    wherein the foil is welded to the second electrode after pre-tinning of a contact area.

11. A connection device for an electric accumulator comprising a first external connection subassembly associated with a first electrode of the electric accumulator, and a second external connection subassembly associated with a second electrode of the electric accumulator, the first external connection subassembly comprising:
    a first metallic conducting strip having several pins for being embedded in the first electrode to make electrical contact, and
    at least one of temperature and electrical protection means housed in a fixed module electrically connected to one end of the strip;
    wherein a sheet of soft metal is disposed between the first external connection subassembly and the first electrode, and wherein the sheet of soft metal is deformed by the pins of the first metallic conducting strip so that there is contact between the first external connection subassembly and the first electrode.

12. A connection device for an electric accumulator comprising a first external connection subassembly associated with a first electrode of the electric accumulator, and a second external connection subassembly associated with a second electrode of the electric accumulator, the first external connection subassembly comprising:

a first metallic conducting strip having several pins for being embedded in the first electrode to make electrical contact, and a fixed module electrically connected to one end of the strip and comprising a temperature switch and an electrical switch for protecting the electric accumulator.

13. A connection device for an electric accumulator according to claim 12, wherein the temperature switch and the electrical switch are a single component.

* * * * *